Figure 1:
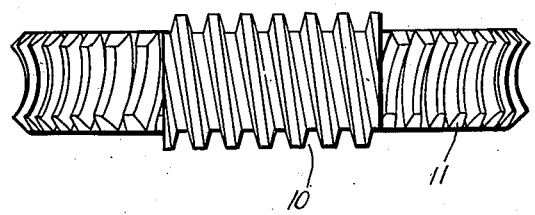

May 21, 1929.  C. H. SCHURR  1,714,109
MACHINE FOR GENERATING WORM WHEELS

Filed Feb. 28, 1927  3 Sheets-Sheet 1

INVENTOR.
Charles H. Schurr
BY
Harry P. Canfield
ATTORNEY.

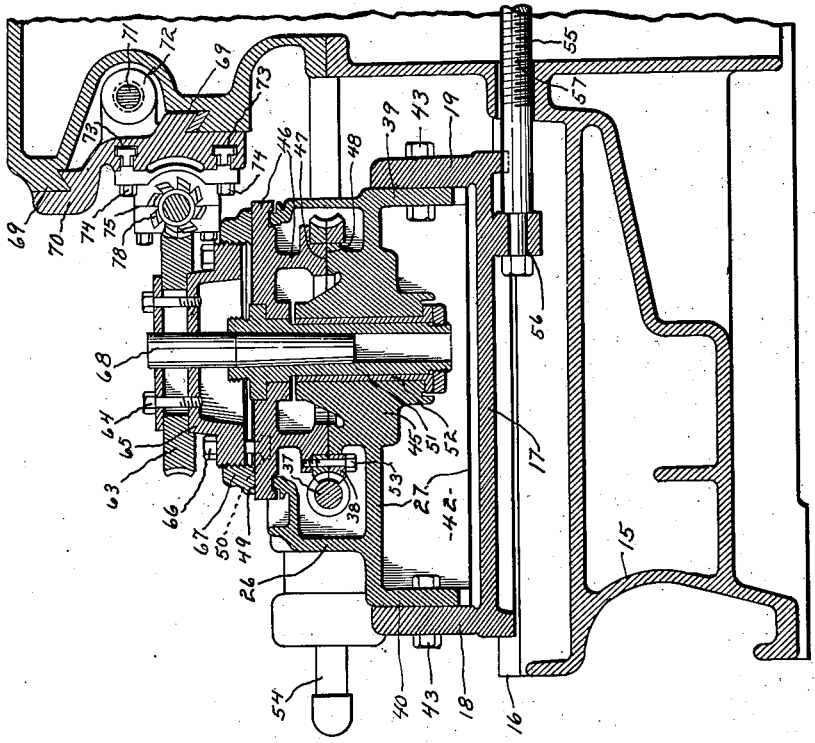
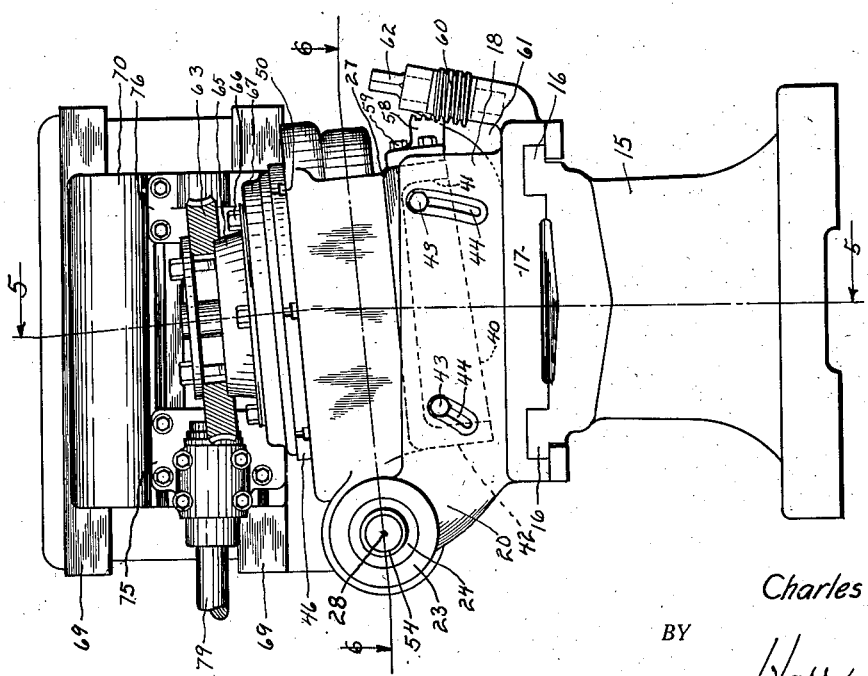

May 21, 1929.  C. H. SCHURR  1,714,109
MACHINE FOR GENERATING WORM WHEELS
Filed Feb. 28, 1927  3 Sheets-Sheet 3
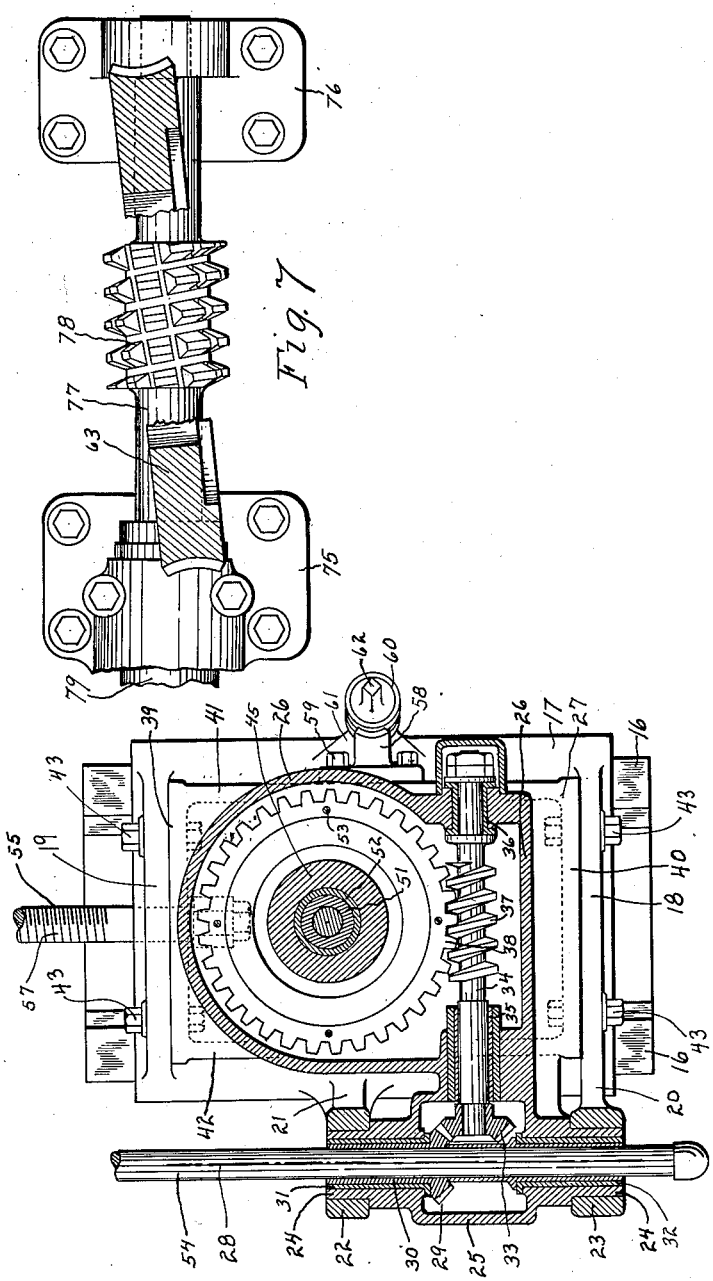
INVENTOR.
Charles H. Schurr
BY
Harry P. Canfield
ATTORNEY.

Patented May 21, 1929.

1,714,109

UNITED STATES PATENT OFFICE.

CHARLES H. SCHURR, OF CLEVELAND, OHIO, ASSIGNOR TO THE LEES-BRADNER COMPANY, OF CLEVELAND, OHIO, A CORPORATION OF OHIO.

MACHINE FOR GENERATING WORM WHEELS.

Application filed February 28, 1927. Serial No. 171,467.

This invention relates to the cutting or generating of worm wheels; and particularly by means of hobs.

In my Patent No. 1,487,895, March 25, 1924, I show a complete machine for hobbing worm wheels, and this present invention is in some respects an improvement thereon. In the present application I have shown and described only a part of a worm wheel generating machine, and reference may be had to the above mentioned patent as illustrating one way of providing those machine parts which, for the sake of brevity, are omitted from the drawing and description of this application.

Hobs employed in cutting or generating worm wheels are preferably of the so-called helical type, that is, the cutting teeth of the hob are arranged around the hob axis in the general path of a helix. Such worm wheel hobs are preferably, and usually, provided with relief on the outer ends of the teeth, that is, on the portions of the teeth most distant from the rotational axis. It is common practice to so shape the hob teeth that, when their cutting faces are ground to sharpen them, the cutting profile is not changed; but, because of the relief on the ends of the teeth, the grinding unavoidably reduces the hob diameter.

Now, as is well known in respect to the geometry of any helical hob, helical worm or the like, the so-called "helical angle" at the outer circumference is less than the helical angle at the root of the hob teeth (or worm thread, as the case may be), the helical angle being defined as the angle between a tangent to the helix and a plane at right angles to its central axis. Therefore, as will be understood, when a helical hob made with relief as above described is sharpened, as by grinding, two results are thereby effected; the outside diameter of the hob is decreased, and its helical angle at the tips of its teeth is increased.

Obviously, therefore, a hob designed to cut or generate a worm wheel for meshing engagement with a worm of a given diameter and helical angle will, after it has been sharpened, no longer cut or generate a worm wheel that will fit the same worm.

In some cases, when the hob has been carefully made and is apparently correct as to diameter and helical angle (and before it has been changed by sharpening), I have found that it nevertheless will cut, on the worm wheel, teeth which are incorrect, for example, as to helical angle. This may be due to a number of remote causes, difficult to locate and correct, in the hobbing machine as a whole, such as a slight amount of distortion or yielding or improper adjustment, or the lack of parallelism in some of the controlling parts.

In the operation of hobbing machines, particularly worm wheel hobbing machines, it is desirable from time to time to correct or adjust the helical angle of the teeth being cut on the worm wheel by the hob; or to compensate for the change in diameter and helical angle of the hob which results from sharpening it. Or it may be desirable to employ a hob of one diameter and helical angle to cut worm wheels which would normally be cut with a hob of different diameter and helical angle; or to otherwise variously co-ordinate the diameter and helical angle of the hob with a desired worm wheel to be cut. I find that these results may be effected to great advantage, and with improved results, in a worm wheel hobbing machine, by suitably arranging the work spindle or support upon which the worm wheel blank is mounted, so that the support may be adjustably rocked about an axis of rotation to adjustably vary the diedral angle formed between the rotational planes of the worm wheel blank and of the hob.

It is therefore the object of this invention to provide a worm wheel hobbing machine in which the work spindle or worm wheel blank support is adjustable in position to vary the said diedral angle between the hob and worm wheel blank; and in which, at all of said adjusted positions, power may be transmitted to the blank support to rotate it relative to the rotating hob and to feed it toward the hob.

Other objects will be apparent.

Figure 2:
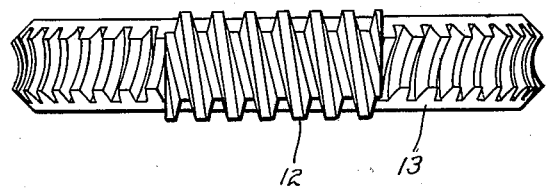
Figure 3:
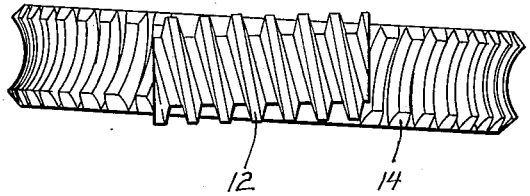

Referring to the drawings: Fig. 1 is a diagrammatic view showing certain relations between a hob, and a worm wheel cut thereby; Fig. 2 is a view similar to Fig. 1, in which a hob of smaller diameter and greater helical angle is shown; Fig. 3 is a view similar to Fig. 2 and in which certain relations of the hob and worm wheel are shown which result from tilting the worm wheel out of the position shown in Fig. 2; Fig. 4 is a front elevation of a worm wheel generating machine embodying my invention, with a hob, which I employ, omitted; Fig. 5 is a sectional view taken from the plane 5—5 of Fig. 4, and showing the hob; Fig. 6 is a sectional view taken from the plane 6—6 of Fig. 4; Fig. 7 is a fragmentary view similar to Fig. 4, enlarged, and with the hob added.

In Figs. 1, 2 and 3, I show diagrammatically the fundamental principle which underlies my invention. In Fig. 1, a helical hob such as may be employed to cut or generate worm wheels is represented diagrammatically at 10. (The lines indicating the cutting edges and faces of the hob have been omitted, for simplicity; if shown, the cutting edges and faces would appear as at 78 in Fig. 7.) The hob 10 is shown in meshed relation with a worm wheel 11 which it has generated. The machine and method employed may be those of my patent above referred to.

In Fig. 2, 12 represents diagrammatically the hob 10 after its diameter has been decreased and its helical angle increased, as occurs in practice when hob teeth are sharpened. At 13 is shown the corresponding worm wheel which such a hob would generate, and, as will be noted, the length of the worm wheel teeth is shorter and their curvature sharper than in Fig. 1, and their helical angle greater.

Obviously, a worm which would mesh with the worm wheel 11 of Fig. 1 would not mesh with the worm wheel 13 of Fig. 2.

In Fig. 3 the same worm 12 is shown with its axis horizontal as in Fig. 2, but the worm wheel 14 with which it meshes and which it has generated is, in Fig. 3, tilted out of the horizontal in accordance with my present invention. The result of this is that the worm 12 generates the worm wheel 14 with teeth approximately of the same shape and dimensions and helical angle as those of the worm wheel 11 of Fig. 1.

As a desirable consequence of positioning the hob and worm wheel relatively as in Fig. 3, a worm which will mesh with the worm wheel 11 cut with the original hob 10 will also mesh with the worm wheel 14 cut with the hob after its diameter has been decreased and its helical angle increased as shown at 12.

As a further desirable consequence, and as is apparent, if the hob 12 of Fig. 2 be considered as the original hob, employed to generate the worm wheel 13 as in Fig. 2, for meshing engagement with a worm of a given diameter and helical angle, the same hob may also be employed to generate a worm wheel, such as 14, for meshing engagement with a worm of larger diameter and smaller helical angle by positioning the hob and worm wheel relatively as in Fig. 3.

The preferred relative positions of the hob and worm wheel or worm wheel blank are such that their planes of rotation intersect each other at oblique diedral angles.

In the following description taken in connection with Figs. 4 to 7, inclusive, I disclose a worm wheel hobbing machine in which, in addition to the well known relative movements of the hob and worm wheel blank, I provide means for adjustably positioning the worm wheel blank and hob relative to each other to carry out the principle and accomplish the objects of my invention above set forth.

Upon the main base 15 of the machine are horizontal or longitudinally arranged ways 16—16 upon which is slidably mounted a slide 17. Rising from each end of the slide 17 are transverse walls 18 and 19. Extending laterally from the slide 17 are arms 20 and 21 terminating in cylindrical bearings 22 and 23 in which trunnions 24 on a bevel gear housing 25 are rotatably supported. The housing 25 is rigidly connected to a worm gear housing 26 and saddle 27, so that the housings 25 and 26 and the saddle 27 may all be adjustably swung or pivoted about the axis 28 of the bearings 22 and 23 in a manner and for a purpose to be described. In the housing 25 is a bevel gear 29 having a tubular shank 30 rotatable in sleeve bearings 31 and 32. A bevel gear 33 in the housing 25 meshes with the gear 29. The bevel gear 33 is mounted on a worm shaft 34 supported in bearings 35 and 36 and carrying between the bearings a worm 37. The worm meshes with a worm gear 38 rotatably supported in the housing 26 in a manner to be described. Depending from the housing 26 are end walls 39 and 40 and side walls 41 and 42 forming the saddle 27, and the outer faces of the end walls 39 and 40 coincide with the inner faces of the end walls 18 and 19 of the slide 17 and may be bolted thereto by bolts 43 in the saddle walls which extend thru curved slots 44 in the end walls 18 and 19. The slots 44 curve circularly about the axis 28.

Carried on the saddle 27 and within the housing 26 is a table support 45 on which both the worm wheel 38 and a table 46 to be described are rotatably mounted. The table support 45 has a transversely arranged annular plane bearing surface 47 upon which a corresponding bearing face 48 of the table 46 is rotatably supported. The table 46 comprises a work supporting surface 49 in which are radial T bolt slots 50, and has a depending axial tubular stem 51 rotatably mounted in a sleeve bearing 52 in the table support 45. The worm wheel 38 above referred to is annular in form and by bolts 53 is secured to the lower side of the table 46 and preferably surrounds the table support 45.

By the construction above described, the housings 25 and 26 and saddle 27 may all be adjustably rotated or swung in unison around the axis 28 on the bearings 22 and 23 and may be securely fixed in any adjusted position by the bolts 43. In any such position, the meshing engagement of the bevel gears 29 and 33 and the engagement of the worm 37 and worm wheel 38 is maintained undisturbed; and in any adjusted position, by means of a splined, power rotated shaft 54 passing thru the bevel gear housing 25 and coaxial with the bearings 22 and 23, and which is splined in and to the tubular shank 30 of the bevel gear 29, power may be transmitted thru the bevel gears 29 and 33 and the worm 37 and worm wheel 38 to rotate the table 46. Furthermore, the power shaft 54, because of its splines (not shown), continues to transmit power while the entire assembly of housings 25 and 26, saddle 27, slide 17 and table 46 are moved longitudinally on the ways 16. A push-and-pull rod 55 bolted to the slide 17 as at 56 is provided to move the slide. The rod 55 is threaded as at 57 and a rotating nut not shown may propel the rod in a manner well known.

To adjust the angular position of the saddle and its related parts about the axis 28, a circular rack 58 is bolted by bolts 59 to the wall 41 of the saddle; and a worm 60 meshing therewith is rotatably mounted in a bracket 61 on the slide 17. Upon applying a crank or other tool (not shown) to the rectangular stem 62 on the worm, the worm may be turned and the saddle swung correspondingly to any adjusted position desired.

The worm wheel blank 63 is carried on the table 46, being bolted directly, by bolts 64, to a jig 65, which in turn is bolted by T bolts 66 to the table; a large annular nut 67, threaded on the jig 65 and supported on the surface 49 of the table 46, being provided to adjust the height of the worm wheel blank 63 above the table. The jig 65 and worm wheel blank 63 are centered on the table 46 by an arbor 68 mounted in the table coaxial with the bearing 52 in which the stem 51 of the table rotates. The movements and positional adjustment of the slide 17 and saddle 27 and table 46 above described are, as will now be understood, communicated to the worm wheel blank 63.

The main frame 15 is provided with transverse ways 69—69 upon which a transverse slide 70 is mounted, and adapted to be slid by well known means indicated (but not fully shown) in Fig. 5 by a rotatable screw 71 engaging a nut 72 on the slide. The slide 70 is provided with parallel T slots 73. Upon the slide, by means of T bolts 74 engaging the slots, bearing blocks 75 and 76 are mounted. The bearing blocks rotatably support a hob shank 77 and a helical hob 78 thereon adapted to be rotatably driven by a hob driving shaft 79.

The mechanism for driving the splined shaft 54 and the hob shaft 79 and for moving the slides 17 and 70, and the means by which the motions of these parts are timed and otherwise coordinated relatively to each other, is not shown or described, it being understood by those skilled in the art how this may be brought about for the desired purpose, and one example thereof being described in my Patent No. 1,487,895, hereinbefore referred to. Assuming the necessary coordination of movements, the operation of the worm wheel hobbing machine hereinbefore described is as follows:

The machine is first set up by loosening the bolts 43, and, by means of the worm 60, swinging the table 46 which carries the worm wheel blank 63 until the blank takes up the desired angular position relative to the hob 78, such, for example, as shown in Fig. 7, for the purpose hereinbefore set forth. The bolts 43 are then tightened. At the same time the height of the blank 63 above the table 46 is suitably adjusted by the nut 67. The longitudinal position of the hob 78 on the ways 69 is also adjusted. The hob is then rotated by means of the shaft 79, and the blank 63 is correspondingly rotated by means of the shaft 54. The rotating blank 63 is then fed toward the rotating hob 78 by means of the rod 55 to cause the hob to cut teeth in the blank.

As will be understood by those skilled in this art, if a worm wheel be cut or generated with only the feeding movement of the blank 63 toward the hob 78, the worm wheel so cut or generated will have tooth profiles only approximating the desirable involute profile, because of the relatively few teeth possible to provide on the hob and the consequently discontinuous cutting action thereof; the resulting profile being in effect composed of a succession of small planular spots. While such a worm wheel is suitable for some purposes, worm wheels having more refined tooth profiles are also needed. Therefore it is sometimes desirable to follow the feed of the blank radially with respect to the hob by a feed of the hob in its longitudinal or axial direction, for by this means the above mentioned flat or planular spots disappear in the generating or cutting process and are merged into each other by infinitesimal steps, producing a tooth profile that approximates very closely a true involute. For this second feeding movement the hob is moved axially by movement of the slide 70 on the ways 69, preferably an amount corresponding to one tooth pitch of the worm wheel being cut. Again, the same result may be obtained by initially positioning the blank 63 at its final or finished distance from the hob axis, with the hob withdrawn axially out of working engagement therewith, and then feeding the hob axially to cut the teeth, in this case all of the feeding being done axially.

I have shown the table 46 swung upwardly above the horizontal for, say, a so-called "right hand" hob and worm wheel. The table may similarly be swung downwardly below the horizontal for a "left hand" hob and worm wheel. Or the table may be swung into the horizontal position and the machine then used as a hobbing machine of the kind heretofore known.

Also the machine may be used to finish or modify or compensate the teeth of a worm wheel already cut, as will be understood, and, in the claims, the expression "worm wheel blank" is to be taken as meaning either a wheel in which teeth are to be cut or a toothed wheel of which the teeth are to be further worked or modified.

I have shown only a cylindrical hob, but hobs that are tapered or conical may be used.

Instead of feeding the hob axially, the worm wheel blank may be fed axially with respect to the hob to effect the same relative axial movement. And instead of feeding the blank toward the hob radially thereof, the hob may be fed radially into the blank to effect the same relative radial movement. Similarly, instead of adjustably tilting the blank, the hob may be adjustably tilted to effect the same relative angular relation.

Other changes and modifications may be made within the scope of my invention.

I claim:

1. In a worm wheel hobbing machine, a rotatably mounted hob, a rotatable worm wheel blank support, a drive shaft arranged at an angle with the rotational axis of the support, power transmission means in engagement between the shaft and the support for rotating it relative to the hob; means for adjustably swinging the support about the axis of the shaft to cause a rotational plane thereof to intersect a rotational plane of the hob at a selected oblique diedral angle and for moving the support axially of the shaft to cause a feeding movement of the support relative to the hob while maintaining said power transmitting engagement; and means for feeding the hob in the direction of its axis relative to the support.

2. In a worm wheel hobbing machine a rotatably mounted hob, a rotatable worm-wheel-blank-support, a drive shaft, power transmission means in engagement between the shaft and the support for rotating it relative to the hob, said transmission means comprising a gear on the drive shaft, a gear on the blank support, a transmission shaft, a gear thereon meshing with the gear on the blank support, and another gear thereon meshing with the gear on the drive shaft, means for adjustably swinging the support and the gear thereon and the transmission shaft and the gears thereon about the axis of the drive shaft to cause a rotational plane of the support to intersect a rotational plane of the hob at a selected oblique diedral angle, means for moving the support and said transmission means axially of the drive shaft to cause a feeding movement of the support relative to the hob while maintaining said power transmitting engagement.

3. In a worm wheel hobbing machine, a rotatably mounted hob, a rotatable worm-wheel-blank-support, a drive shaft arranged at an angle with the rotational axis of the support, power transmission means in engagement between the shaft and the support for rotating it relative to the hob, said means comprising a worm wheel on the support and a bevel gear splined on the drive shaft and a transmission shaft and a worm on the transmission shaft meshed with the worm wheel on the support and a bevel gear on the transmission shaft meshed with the bevel gear splined on the drive shaft, means for adjustably swinging the support, worm wheel, transmission shaft and worm and bevel gear thereon about the axis of the drive shaft to cause a rotational plane of the support to intersect a rotational plane of the hob at a selected oblique diedral angle, means for moving the support and said splined gear axially of the shaft to cause a feeding movement of the support relative to the hob while maintaining said power transmitting engagement.

4. In a worm wheel hobbing machine, a main frame, a rotatably mounted hob on the frame, ways on the frame, a slide on the ways, a table on the slide, a rotatable worm wheel blank support carried by the table, a drive shaft arranged parallel with the ways, a support bearing on the slide, a bearing member on the table, the support bearing being adapted to rotatably support the said bearing member and drive shaft co-axially thereon whereby the table may be adjustably swung around the axis of the shaft, power transmitting means carried by the table and in power transmitting engagement with the shaft and support for rotating the support relative to the hob, means for moving the slide on the ways to move the table and transmitting means axially of the shaft to cause a feeding movement of the support relative to the hob, while maintaining said power transmitting engagement between the shaft and the support and at any swung position of the table.

5. In a worm wheel hobbing machine, a rotatably mounted hob, a rotatable worm wheel blank support, a power supplying member having a rotational axis arranged at an angle with the rotational axis of the support, a power transmission means in engagement between said member and the support for rotating it relative to the hob, means for adjustably swinging the support about the said axis of said member to cause a rotational plane of a blank on said support to intersect a rotational plane of the hob at a preselected oblique diedral angle, means for moving the support axially of the member to cause a feeding movement of the support relative to the hob while maintaining said power transmitting engagement.

6. In a worm wheel hobbing machine, a frame, a rotatably mounted hob on the frame, ways on the frame, a slide on the ways, a rotatable worm wheel blank support on the slide, a power supplying member having a rotational axis arranged substantially parallel with the ways, power transmission means in engagement between the power supplying member and the support for rotating it relative to the hob, means for adjustably swinging the support about said axis of said member to cause a rotational plane of a blank on said support to intersect a rotational plane of the hob at a selected oblique diedral angle, means for moving the support on the ways axially of said member to cause a feeding movement of the support relative to the hob while maintaining the said power transmitting engagement.

7. In a worm wheel hobbing machine, a main frame, a rotatably mounted hob on the frame, ways on the frame, a slide on the ways, a swingable table on the slide, a rotatable worm wheel blank support carried by the table, a power supplying member arranged with a rotational axis parallel with the ways, a bearing for the table on the slide, coaxial with said power supplying member, power transmitting means carried by the table in power transmitting engagement between the power supplying member and the support for rotating the support relative to the hob, means for moving the slide on the ways to cause a feeding movement of the support relative to the hob while maintaining power transmitting engagement between the power supplying member and the support and at any swung position of the table.

8. In a worm wheel hobbing machine, a helical hob, a worm wheel blank support, means for rotating the hob and the support to give to the hob and a worm wheel blank mounted on the support relative rotary movement suitable for hobbing, means for feeding the blank support toward the hob, means for rocking the support about an axis which is parallel to the direction of said feeding movement and external to the worm wheel blank and hob for adjustably positioning a blank on the support relative to the hob to cause a hob rotational plane to intersect a blank rotational plane at a selected oblique diedral angle and means for supplying power to effect said movements at all of said adjusted positions.

9. In a worm wheel hobbing machine, a helical hob, a worm wheel blank support, means for rotating the hob and the support to give to the hob and a worm wheel blank mounted on the support relative rotary movement suitable for hobbing, means for feeding the blank support toward the hob, means for rocking the support about an axis which is parallel to the direction of said feeding movement for adjustably positioning a blank on the support relative to the hob to cause a hob rotational plane to intersect a blank rotational plane at a selected oblique diedral angle and means for supplying power to effect said movements at all of said adjusted positions.

10. In a worm wheel hobbing machine, a rotatably mounted hob, a rotatable worm wheel blank support, a drive shaft arranged at an angle with the rotational axis of the support, power transmission means in engagement between the shaft and the support for rotating it relative to the hob; means for adjustably swinging the support about the axis of the shaft to cause a rotational plane thereof to intersect a rotational plane of the hob at a selected oblique diedral angle and for moving the support axially of the shaft to cause a feeding movement of the support relative to the hob while maintaining said power transmitting engagement.

11. In a worm wheel hobbing machine, a helical hob, a worm wheel blank support, hob rotating means, blank support rotating means, blank support feeding means for feeding the support relatively to the hob, the blank support being adjustable relative to the hob to cause a rotational plane of the blank support to intersect a rotational plane of the hob at a selected diedral angle, said support rotating means being adapted to rotate said support at all angular adjusted positions thereof and concurrently with the said feeding of said support.

In testimony whereof, I have hereunto signed my name.

CHARLES H. SCHURR.